United States Patent
Gurule et al.

(10) Patent No.: US 10,553,127 B1
(45) Date of Patent: *Feb. 4, 2020

(54) DYNAMIC MOTION SEAT

(71) Applicant: ACME Worldwide Enterprises, Inc., Albuquerque, NM (US)

(72) Inventors: Randall S. Gurule, Albuquerque, NM (US); Douglas D. Sutton, Albuquerque, NM (US); E. Victor Maestas, Placitas, NM (US); Peter Agnew, Albuquerque, NM (US); Matthew Hastey, Albuquerque, NM (US); Michael T. Skelton, Albuquerque, NM (US)

(73) Assignee: ACME WORLDWIDE ENTERPRISES, INC., Albuquerque, NM (US)

( * ) Notice: Subject to any disclaimer, the term of this patent is extended or adjusted under 35 U.S.C. 154(b) by 787 days.

This patent is subject to a terminal disclaimer.

(21) Appl. No.: 14/481,474

(22) Filed: Sep. 9, 2014

Related U.S. Application Data

(63) Continuation of application No. 12/463,151, filed on May 8, 2009, now Pat. No. 8,827,709.

(60) Provisional application No. 61/051,531, filed on May 8, 2008.

(51) Int. Cl.
| | |
|---|---|
| *G09B 9/02* | (2006.01) |
| *G09B 9/04* | (2006.01) |
| *G09B 19/16* | (2006.01) |
| *G09B 9/12* | (2006.01) |
| *G09B 9/08* | (2006.01) |

(52) U.S. Cl.
CPC ............... *G09B 9/02* (2013.01); *G09B 9/04* (2013.01); *G09B 9/08* (2013.01); *G09B 9/12* (2013.01); *G09B 19/16* (2013.01)

(58) Field of Classification Search
CPC ... G09B 9/10; G09B 9/08; G09B 9/12; G09B 9/28; G09B 9/00
USPC .................... 434/29, 37, 39, 59, 71
See application file for complete search history.

(56) References Cited

U.S. PATENT DOCUMENTS

| | | | |
|---|---|---|---|
| 3,270,440 A | | 9/1966 | Radosevic, Jr. |
| 3,309,795 A | | 3/1967 | Helmore et al. |
| 3,628,829 A | | 12/1971 | Heilig |
| 3,983,640 A | | 10/1976 | Cardullo et al. |
| 4,030,207 A | | 6/1977 | Kron |
| 4,059,909 A | | 11/1977 | Kron |
| 4,164,079 A | | 8/1979 | Ashworth |
| 4,321,044 A | * | 3/1982 | Kron ........................ G09B 9/10 297/284.9 |
| 4,347,055 A | | 8/1982 | Geiger |
| 4,879,849 A | | 11/1989 | Hollingsworth, III et al. |
| 5,022,708 A | * | 6/1991 | Nordella .................. G09B 9/14 248/182.1 |
| 5,240,416 A | * | 8/1993 | Bennington ............. G09B 9/08 244/75.1 |
| 5,277,584 A | * | 1/1994 | DeGroat ................ G09B 9/052 434/29 |

(Continued)

FOREIGN PATENT DOCUMENTS

DE      199 53 211      5/2001

*Primary Examiner* — Xuan M Thai
*Assistant Examiner* — Sadaruz Zaman
(74) *Attorney, Agent, or Firm* — Peacock Law P.C.; Janeen Vilven

(57) ABSTRACT

Embodiments of the present invention comprise a dynamic motion seat with at least five directions of motion for vehicle simulation.

17 Claims, 16 Drawing Sheets

(56) References Cited

U.S. PATENT DOCUMENTS

| | | | |
|---|---|---|---|
| 5,372,505 A | | 12/1994 | Smith |
| 5,431,569 A | * | 7/1995 | Simpkins .................. G09B 9/02 |
| | | | 434/29 |
| 5,499,920 A | * | 3/1996 | Trumbull ............... A63G 31/16 |
| | | | 434/29 |
| 5,527,184 A | * | 6/1996 | Trumbull ............... A63G 31/16 |
| | | | 434/29 |
| 5,678,889 A | | 10/1997 | Purcell, Jr. |
| 5,885,080 A | | 3/1999 | Letovsky |
| 5,915,786 A | | 6/1999 | Kotani |
| 5,980,255 A | * | 11/1999 | Mathieu ................... A47C 7/72 |
| | | | 434/29 |
| 6,210,165 B1 | | 4/2001 | Sugimori |
| 6,283,757 B1 | | 9/2001 | Meghnot et al. |
| 6,445,960 B1 | | 9/2002 | Borta |
| 6,612,650 B1 | * | 9/2003 | Ambrosio ............... A47C 1/035 |
| | | | 297/330 |
| 6,733,293 B2 | * | 5/2004 | Baker ..................... G09B 19/16 |
| | | | 434/55 |
| 6,793,495 B2 | | 9/2004 | Kang |
| 6,909,205 B2 | | 6/2005 | Corcoran et al. |
| 7,717,711 B2 | | 5/2010 | MacDonald |
| 8,827,709 B1 | | 9/2014 | Gurule et al. |
| 2003/0134676 A1 | | 7/2003 | Kang |
| 2004/0229192 A1 | * | 11/2004 | Roy ..................... A47C 15/004 |
| | | | 434/29 |
| 2005/0069839 A1 | * | 3/2005 | Denne .................... A63F 13/08 |
| | | | 434/29 |
| 2007/0202470 A1 | | 8/2007 | Petruzziello |
| 2009/0047636 A1 | | 2/2009 | Van Biervliet |
| 2009/0135133 A1 | * | 5/2009 | Kunzler .................. A63F 13/06 |
| | | | 345/156 |

* cited by examiner

DYNAMIC MOTION SEAT

CROSS-REFERENCE TO RELATED APPLICATIONS

This application is a Continuation of U.S. patent application Ser. No. 12/463,151, entitled "Dynamic Motion Seat", filed on May 8, 2009, and issued as U.S. Pat. No. 8,827,709 on Sep. 9, 2014, which claims priority to and the benefit of the filing of U.S. Provisional Patent Application Ser. No. 61/051,531, entitled "Dynamic Motion Seat", filed on May 8, 2008, and the specification thereof is incorporated herein by reference.

BACKGROUND OF THE INVENTION

Field of the Invention (Technical Field)

Embodiments of the present invention relate to dynamic motion seats for vehicle simulations and methods of use.

DESCRIPTION OF RELATED ART

During maneuvering, significant somatic perceptions are available to drivers or pilots of vehicles and are induced by the inertial acceleration reaction on the drivers body and the coupling existing between the body and the actual vehicle seat. Such maneuvering exposes drivers to a broad range of vibratory information concerning vehicle dynamic states as well as configuration. It is well known that drivers employ these perceptions in the handling of their vehicles. Consequently, in the art of vehicle simulators an effort has been made to develop devices which provide a rendition of these cues in the simulation of vehicles.

BRIEF SUMMARY OF THE INVENTION

An embodiment of the present invention can comprise at least five axes of motion which used in combination together replicate the relative magnitude of force felt on the body produced by vehicle motion. The unique capability of the present invention is that it can reproduce the forces on the body using a combination of hardware controlled by a computer with software that translates simulated vehicle motion data into seat motion. This seat motion is then interpreted by the body as vehicle motion. An embodiment of the present invention can utilize vehicle motion from simulated aircraft (fixed and rotary wing), spacecraft, ground vehicles, and seaborne vehicles. Several embodiments of the present invention can replicate the look of specific vehicles, but the concept of transitioning simulated vehicle motion into dynamic seat motion remains the same over all of the variations.

One embodiment of the present invention comprises a dynamic motion seat (DMS) system that simulates vehicle motion. This embodiment comprises a seat comprising at least one motor, at least one mechanical linkage, and at least five axes of motion and a DMS computer that translates data from a host computer and creates corresponding seat motion signals, wherein the DMS computer is in communication with a host computer and electronic components. The electronic components covert the seat motion signals from the DMS computer into drive signals that trigger the motor. The motor actuates at least one mechanical linkage to cause movement in at least one axes of the five axes of motion to simulate vehicle motion in the seat wherein the motor is in communication with the electronic components.

In another embodiment of the present invention, the dynamic motion seat system comprises a monitor connected to the DMS computer. The five axes of motion are preferably squab heave, bucket heave, tilt, sway, and surge. In an alternative embodiment of the present invention, the dynamic motion seat system can comprise a safety interlock, a tune tab, a test tab, a seat pad and a backpad. The seat and back pad can move independently.

In yet another embodiment of the present invention, the mechanical linkage can comprise at least one bell crank, at least one rod and/or both. The electronic components preferably comprise a motor controller.

A further embodiment of the present invention comprises a method for simulating vehicle motion for training a subject. This embodiment comprises seating the subject in a seat having at least 5 axes of motion, a motor, and at least one mechanical linkage, initializing a vehicle motion simulation via a host computer that is in communication with a dynamic motion seat (DMS) computer, sending signals to the DMS computer from the host computer regarding how the seat should move based on the simulation, translating the signals to create corresponding seat motion signals, converting the seat motion signals received from the DMS computer into drive signals via electronic components, triggering movement of the seat via a motor in communication with the electronic components, actuating a selected mechanical linkage to cause movement in at least one axes of the five axes of motion of the seat to simulate vehicle motion that is felt by the subject, wherein the simulated vehicle motion replicates the relative magnitude of force produced by an actual vehicle in motion, correlating the simulated vehicle motion to a visual view of a vehicle in motion presented to the subject in the seat and training the subject to respond to the vehicle motion.

The method can comprise moving one or more of the five axes of motion independently of the other axes of motion. In this embodiment, the subject can respond to the vehicle motion via a steering wheel, a control stick, one or more pedals, and/or a throttle.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

As used throughout this specification, vehicle is defined as a non-living means of transport, including but not limited to, aircraft, helicopters, trains, ships, boats, bicycles, cars, trucks, all-terrain vehicles and motorcycles. As used herein, "a" means one or more.

Figure 13:
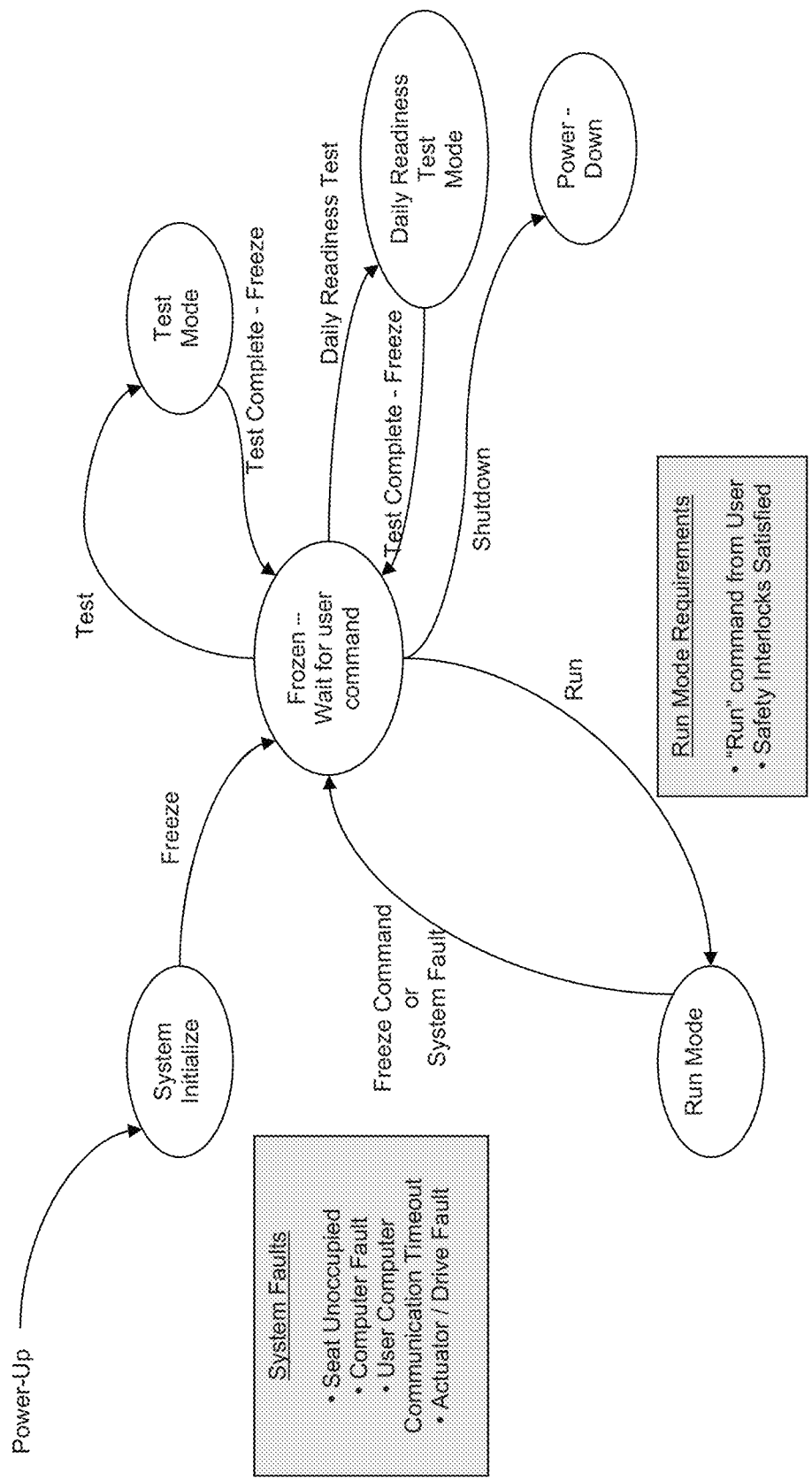
FIG. 13 is a flowchart of an embodiment of the present invention.

FIG. 13 is a flow chart illustrating the overall flow and operation of an embodiment of the present invention. The system is powered up by a user and initialized. The system then stands by for a user command. Once a user places the system in "run" mode, the system begins to run if the safety interlocks are satisfied. The system will automatically "freeze" and discontinue running if the seat is unoccupied, there is a computer fault, there is a host computer communication timeout or there is an actuator/drive fault. If the user decides to put the system in test mode, the system will perform a test and then "freeze" to wait for another command from the user. This is also true if the user decides to run a daily readiness test. Once the user is done using the system, the user shuts down the system, and it is powered down.

One embodiment of the present invention comprises a dynamic motion seat (DMS) system driven by software that is preferably part of the seat system. This embodiment preferably comprises three components: a DMS that preferably replicates the form, fit, and function of a vehicle seat, as illustrated in FIGS. 1A to 10, a DMS computer and an electronics chassis. The DMS comprises a motor, preferably five or more motors. The motors comprise sensors, preferably integrated position sensors that are coupled to mechanical linkages that dynamically drive the DMS. The motors move the seat pan, bucket, and back pad positions in response to motion commands from the seat software. The second component of the present embodiment comprises a DMS computer. The DMS computer preferably receives simulation data from a host computer and creates corresponding motion commands for the DMS. The DMS computer preferably connects to a host computer and provides a user interface for controlling and monitoring the DMS system. The third component of this embodiment comprises an electronics chassis. The electronics chassis houses the electronic components of the DMS. The components preferably translate input signals from the DMS computer into voltage commands that drive the DMS motors. The DMS motors then actuate mechanical linkages which move the seat. In this embodiment, built-in software on the DMS computer receives motion cues from simulator software in a host computer. Based on the cues, both the seat bucket and the seat pan of the DMS can move in one or more directions and preferably five or more directions using mechanical linkages. These directions can include, but are not limited to, driven vertically in a seat bucket and a seat pan (bucket heave and squab heave), each side of the seat pan can independently be driven vertically (tilt), and the back pad of the DMS can be driven laterally (sway) and longitudinally (surge). Additional directions that can optionally be included for specific variants are roll-tilt that combines the lateral and longitudinal motion by tilting the back pad in a roll motion and tilting the back pad in a pitch type motion. The relationship of the three main components is illustrated in FIG. 2. Specifically, FIG. 2 illustrates DMS monitor 200 connected to DMS computer 202 which sends signals to electronic chassis 204 and 206 which in turn translates input signal from DMS computer 202 into commands that drive DMSs 208 and 210 using one or more mechanical linkages.

Figure 1A:
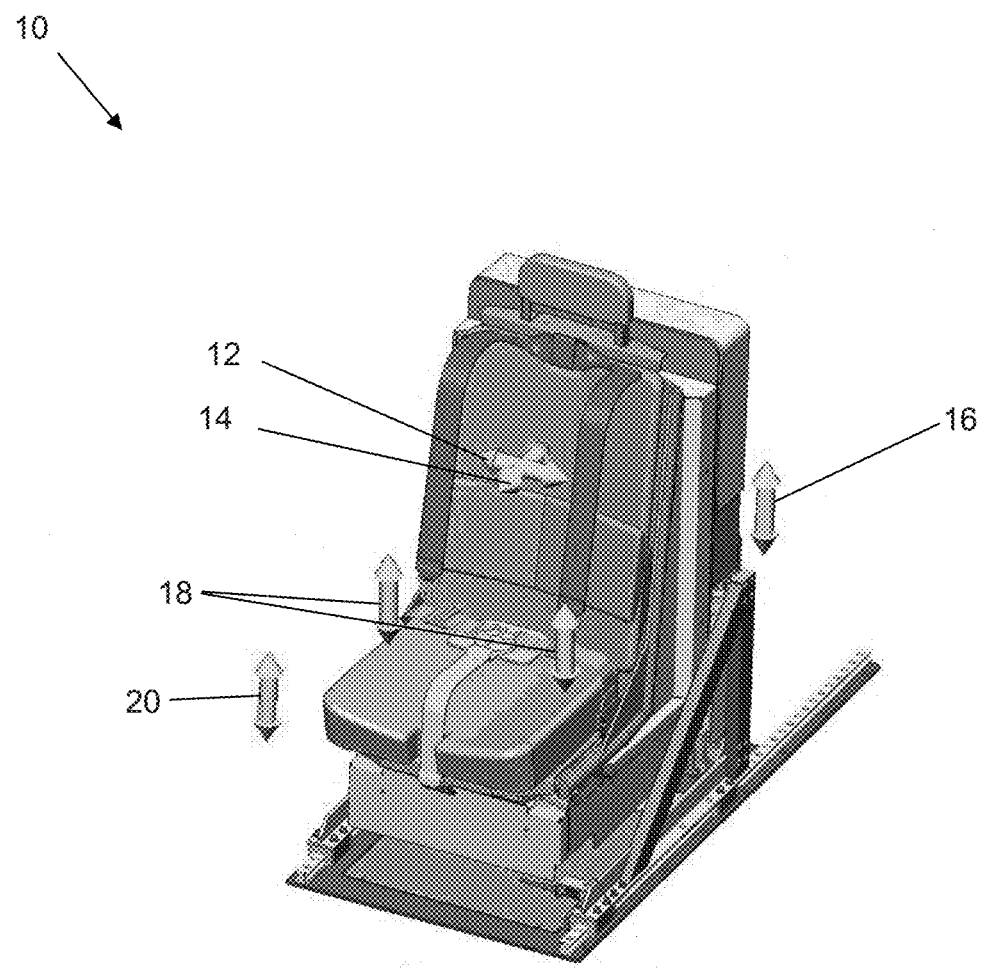
FIGS. 1A-1C illustrate different views of an embodiment of the present invention comprising a Dynamic Motion Seat (DMS)
Figure 1B:
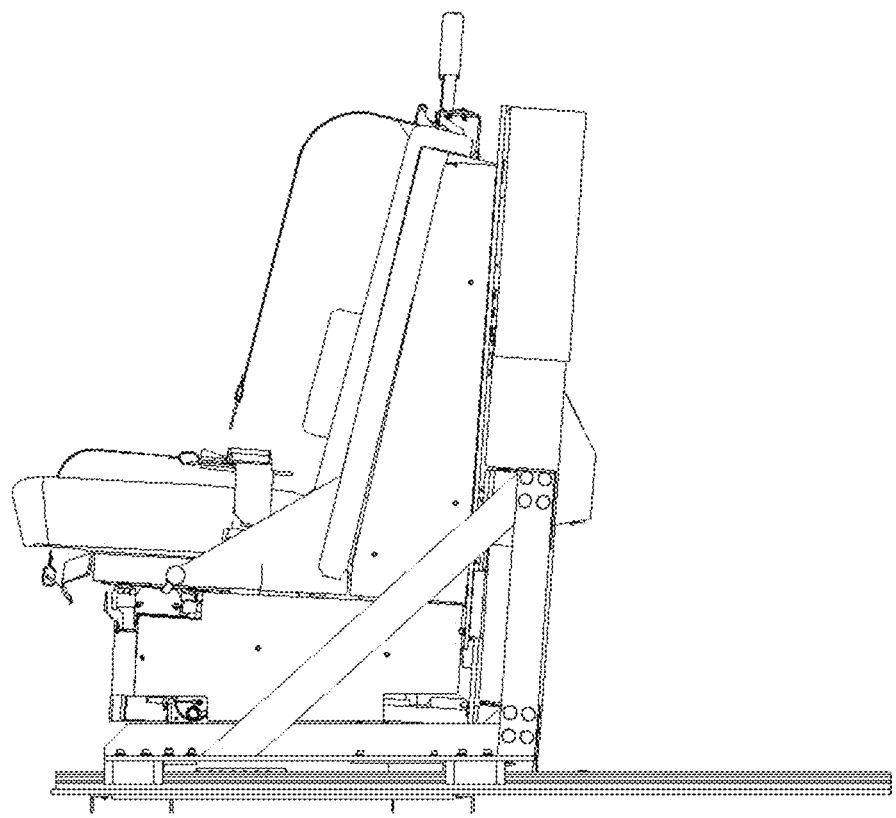
Figure 1C:
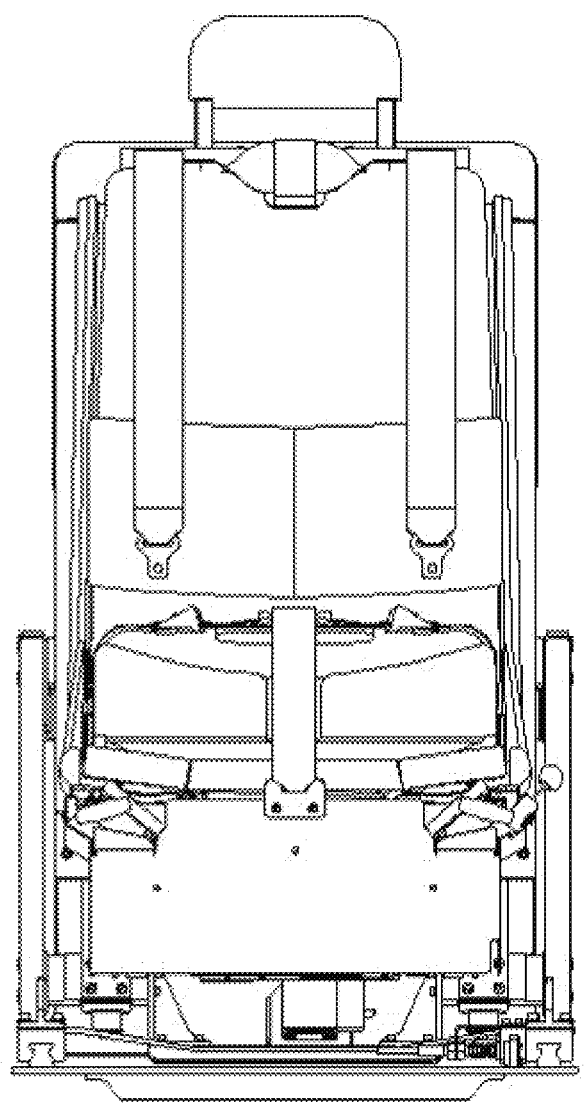
Figure 2:
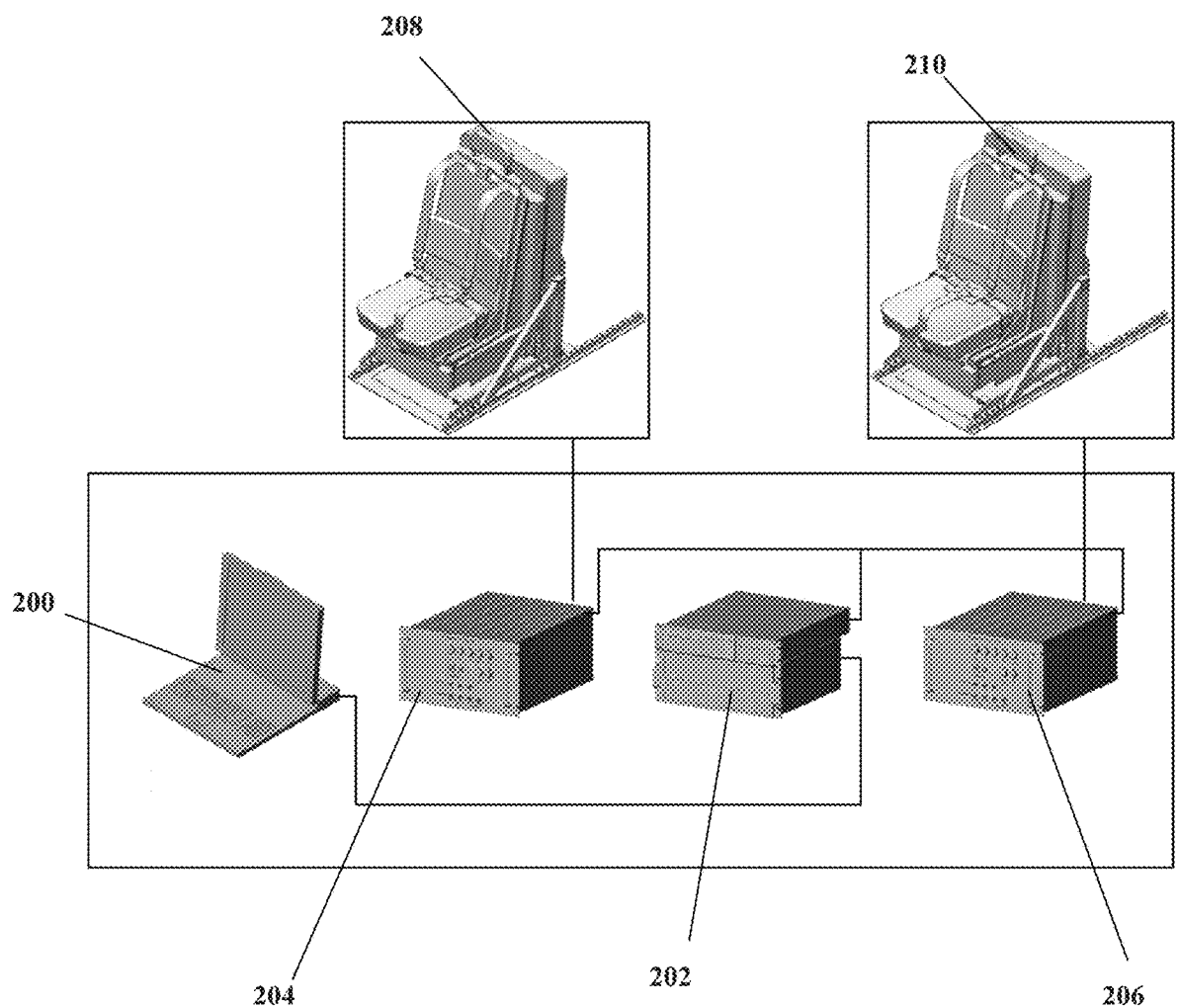
FIG. 2 illustrates an embodiment of the present invention comprising three main components.

FIG. 1A illustrates an embodiment of the present invention comprising DMS 10. This embodiment also illustrates the five different directions of motion. The five directions include sway 12, surge 14, bucket heave 16, tilt 18, and squab heave 20. The mechanical linkages can preferably move independently of each other causing the five directions to move independently of each other.

In another embodiment of the present invention, the DMS computer, one or more electronics chassis, and a monitor and/or keyboard unit are preferably mounted in a rack or cabinet assembly. In a preferred embodiment, one or more DMSs can be operated through a single cabinet assembly.

In yet another embodiment of the present invention, a DMS computer receives acceleration and velocity data from a host computer preferably via an Ethernet or SCRAMNet network connection. The DMS computer translates the inputs and creates corresponding seat motion signals sent to a motor controller in the electronics chassis. In this embodiment, the motor controller converts the DMS computer commands into drive signals that actuate the DMS motors. The DMS motors then actuate mechanical linkages that create simulated motion of a vehicle, preferably an aircraft vehicle. The mechanical linkages preferably comprise a bell crank and/or a rod and more preferably comprise a series of bell cranks and rods that translate rotary motion into linear motion, either vertical or horizontal. Examples of simulated motions include, but are not limited to, vertical motion of the seat pan (squab) and bucket (heave), independent left/right vertical motion of the seat pan (tilt), lateral motion of the seat back pad (sway), and longitudinal motion of the seat back pad (surge). The DMS computer monitors a motor position sensor to verify correct actuator motion. The DMS computer optionally has the capability to drive multiple DMSs independently of each other.

In one embodiment of the present invention, the DMS computer comprises a software dongle. The dongle is preferably to be installed in a universal serial bus (USB) port for all computer operations. In this embodiment, without the optional dongle, the DMS system will not operate. The dongle is used to authenticate and secure the software.

Figure 3:
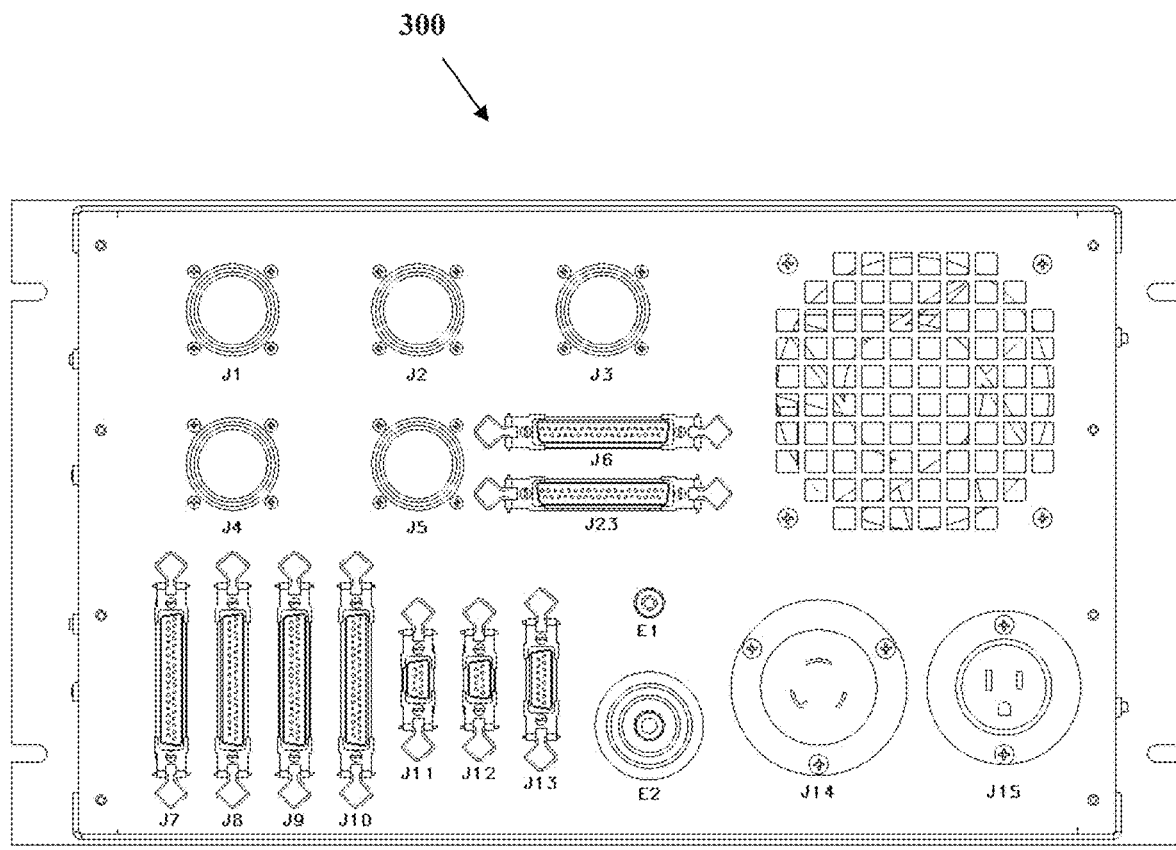
FIG. 3 illustrates an embodiment of the present invention comprising interlocks, signal, power, and sound transducer interface on an electronics chassis.
Figure 4:
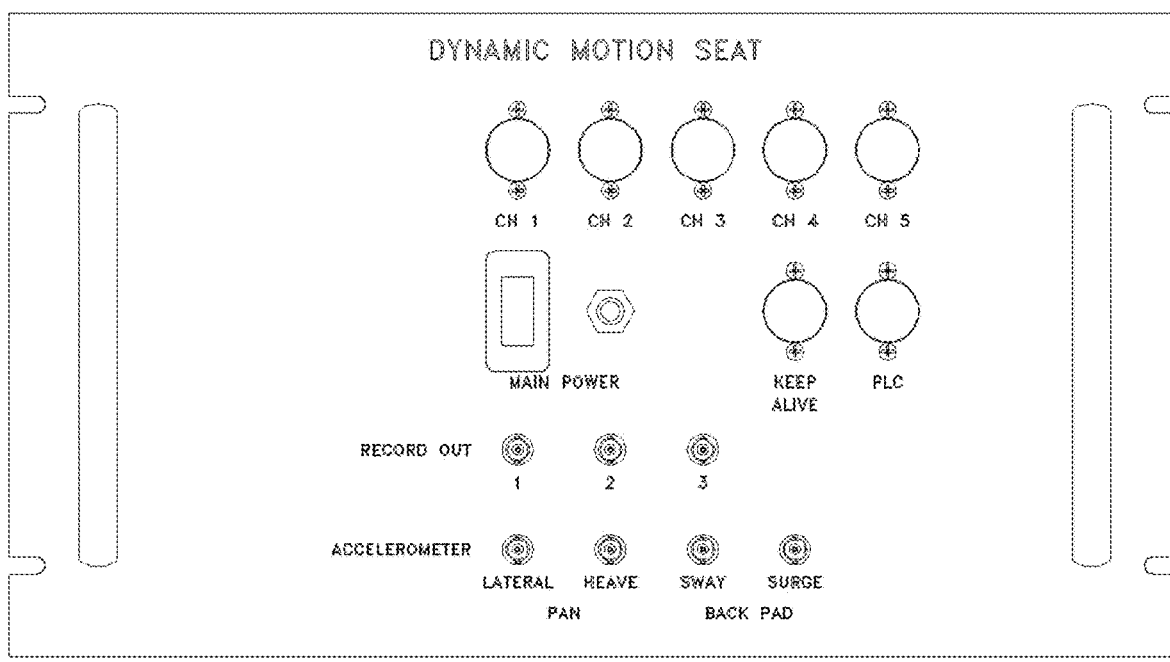
FIG. 4 illustrates an embodiment of the present invention comprising power switch, fuses, and accelerometer outputs on the front of an electronics chassis.
Figure 5:
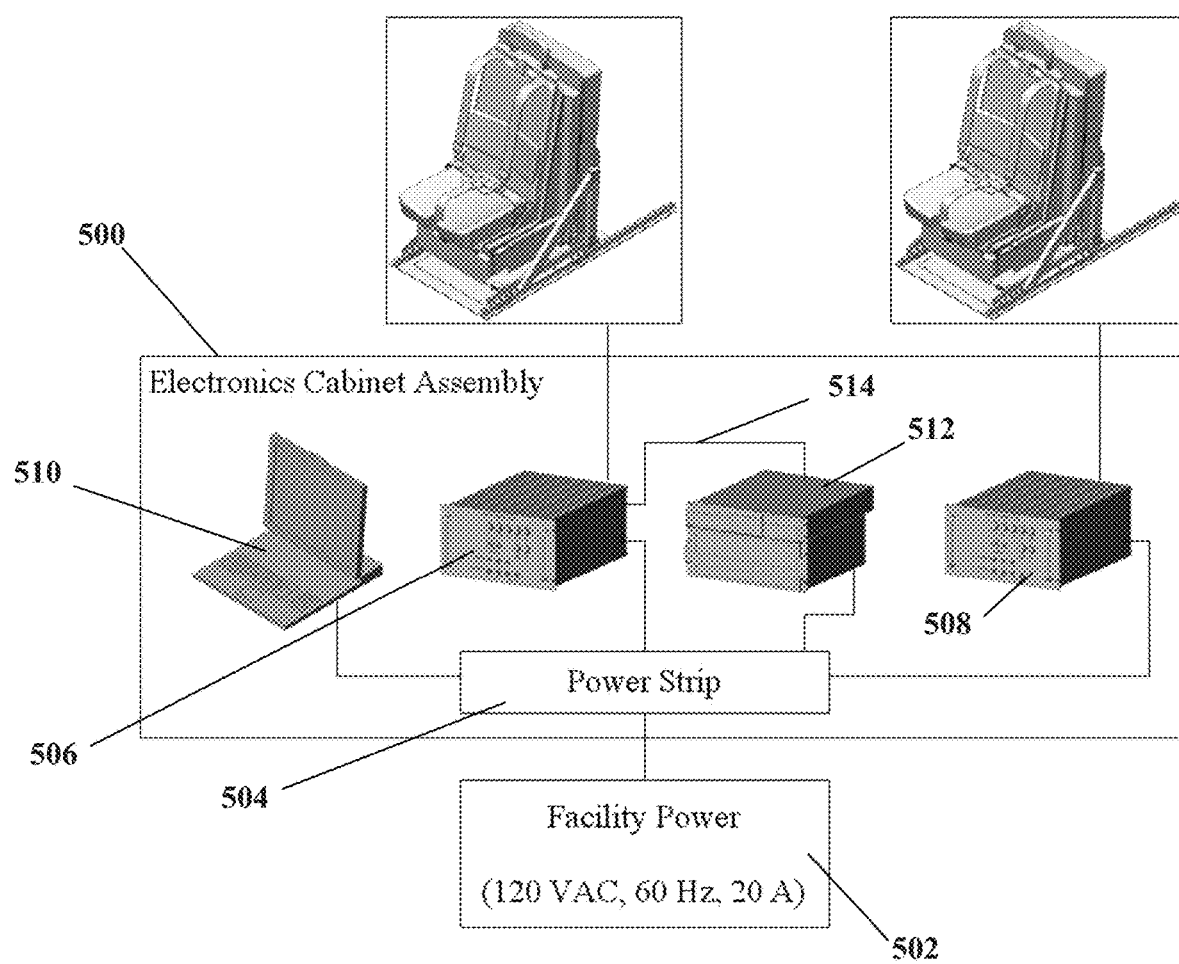
FIG. 5 illustrates an embodiment of the present invention comprising power connections within the electronics cabinet assembly.

In another embodiment of the present invention, an electrical interface of a DMS computer comprises a power source, a user host communications network, an interlock, an accelerometer, and an input for a sound transducer. The interlocks and sound transducer preferably interface to a connector on the back of electronics chassis 300, as illustrated in FIG. 3. Accelerometers outputs interface to a connector, preferably a bayonet Neill-Concelman (BNC) connector and more preferably to four BNC connectors, on the front of electronics chassis 400, as illustrated in FIG. 4. A communications network preferably interfaces to an Ethernet port on the back of the DMS computer. Power is supplied to inside electronics cabinet assembly 500 from outside power source 502 as illustrated in FIG. 5. In this embodiment, electronics cabinet assembly 500 is preferably connected to a dedicated circuit, and more preferably connected to a 120 VAC 60 Hz, 20 amp circuit. Power to the electronics chassis' 506 and 508, DMS monitor 510 and DMS computer 512 is preferably supplied by power strip 504 located in electronics cabinet assembly 500. DMS computer 512 also preferably receives power from connector 514 located on electronics chassis 506. FIG. 5 illustrates the power connections within electronics cabinet assembly 500.

In yet another embodiment of the present invention, one or more safety interlocks are integrated into the DMS. The safety interlocks are designed with consent switches, but the switches can also be bypassed. If desired, a user can disable one or both of the consent switches. Safety interlocks disable the DMS if a user is not in the DMS or an electrical component has failed.

In one embodiment of the present invention, external power is applied to the support electronics from an outlet that preferably provides 120 VAC, 60 Hz, 20 Amp power. A switch on the motor chassis control panel preferably controls power to a Programmable Logic Controller (PLC) and motor drives. In this embodiment, when interlock switch logic is met, the PLC inputs a signal to an input on the motor drives that, in turn, control the DMS motors. There is preferably a motor controller for each of the plurality of motors that drive the DMS's movements.

In an embodiment of the present invention, the DMS computer preferably comprises different types of computer Peripheral Component Interconnect (PCI) boards, these PCI boards can include but are not limited to:

Analog Output, Digital Input, Digital Output (AO-DI-DO) that passes analog and digital signals from the motor drives and PLC to the DMS computer A quadrature encoder board that passes motor position data from the motor drives to the DMS computer An RS485 board that communicates with the motor drives In this embodiment, the DMS electronics form individual DC servo loops or channels that drive the DMS's directions of motion. The DC servo motors convert an input signal from the motor drives into seat motion through mechanical linkages. The mechanical linkages preferably comprise at least one bell crank and/or tie rod and more preferably comprise series of bell cranks and tie rods. Each servo loop preferably comprises a motor drive, the AO-DI-DO boards, and the quadrature encoder boards in the DMS computer. Error signals can be initiated from differences between the signals from the host computer and the feedback signals from the motor drives. The signals are fed into the motor drives that perform a summing function to produce movement commands to the DMS's motors.

Figure 6:
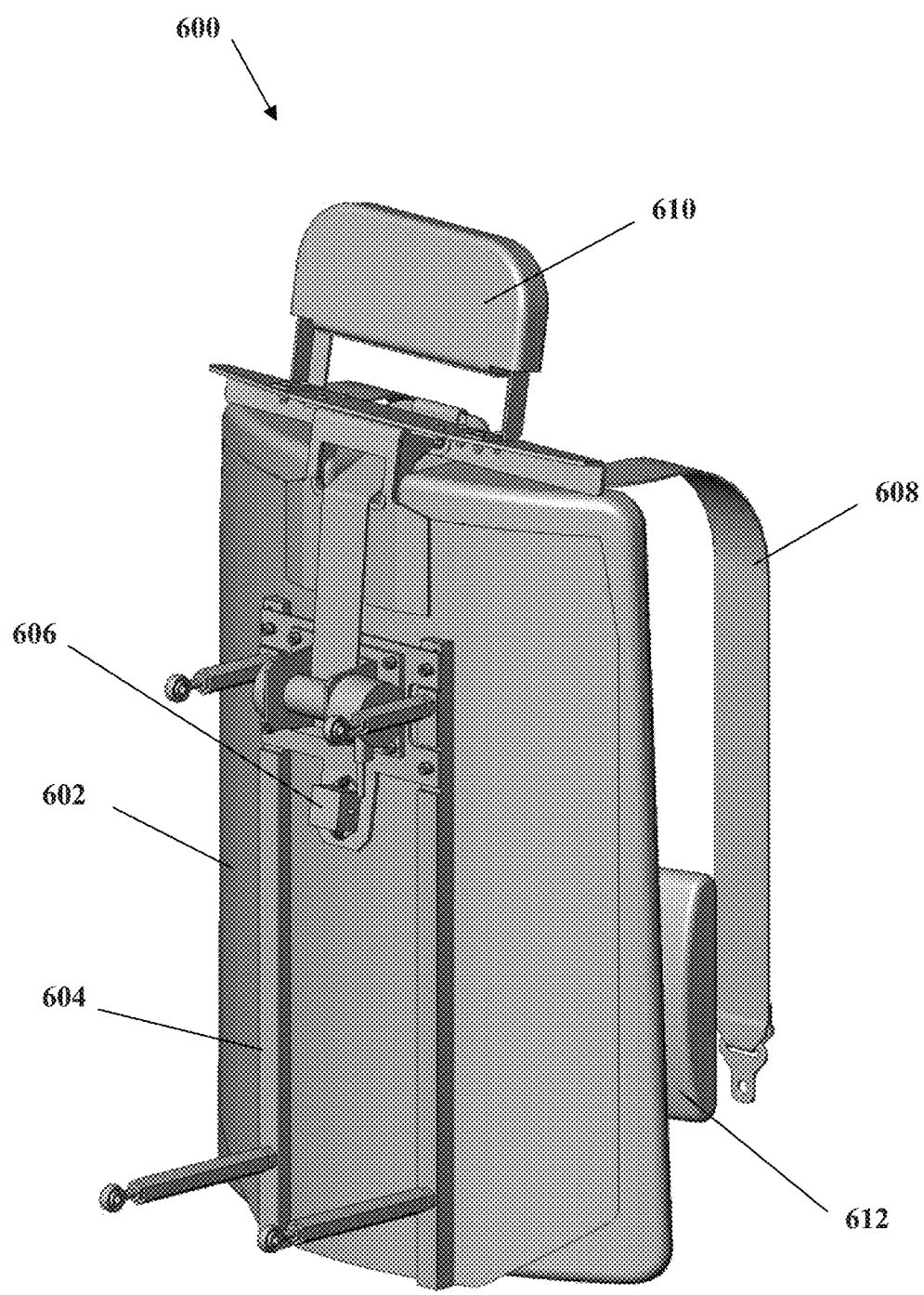
FIG. 6 illustrates an embodiment of the present invention comprising a back pan assembly for a DMS.

Mechanically, the seat assembly is comprised of one or more, and preferably six removable subassemblies. The removable subassemblies can include, but are not limited to:

Back pan assembly
Seat pan assembly
Bucket assembly
Motor drive assembly
Rear plate assembly
Base assembly Referring to FIG. 6, back pan assembly 600 of an embodiment of the present invention preferably comprises back pan 602, tie rod 604, accelerometer 606, shoulder harness assembly 608, headrest with headrest cover 610. Back pan assembly 600 also preferably comprises tape for attaching back pad 602 and lumbar cushion 612.

Figure 7:
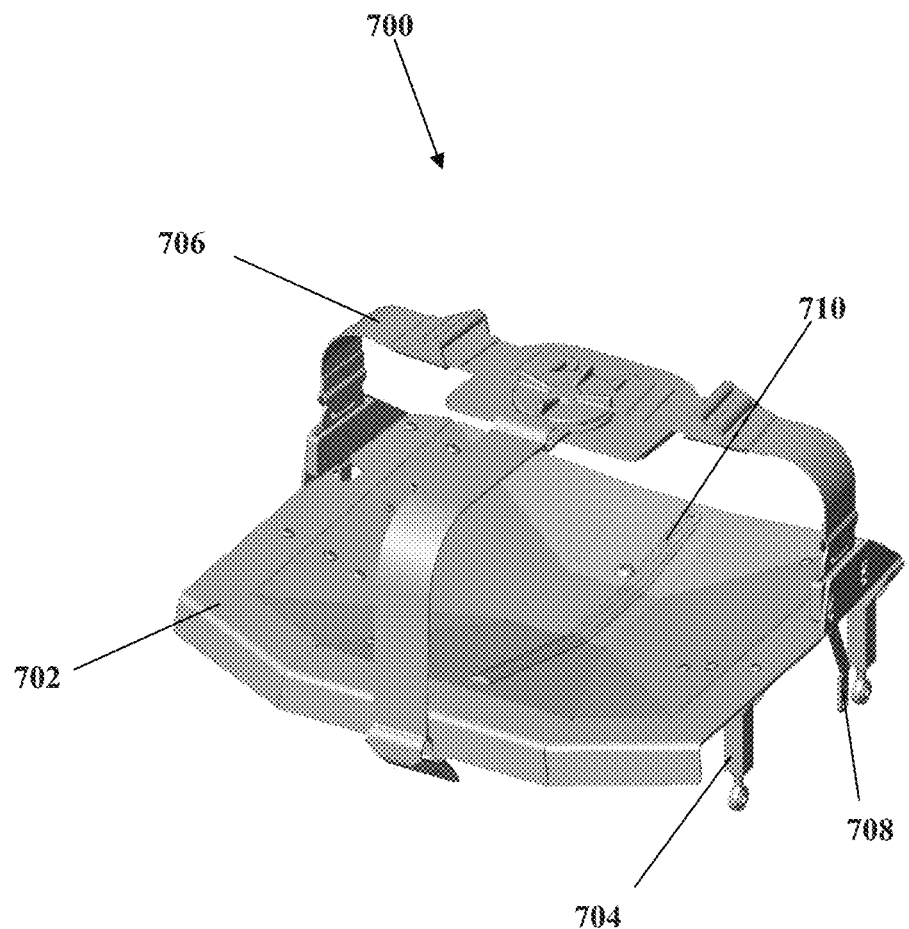
FIG. 7 illustrates an embodiment of the present invention comprising a seat pan assembly fora DMS.

As illustrated in FIG. 7, an embodiment of the present invention comprises seat pan assembly 700 which preferably comprises seat pan 702, tie rod 704, and lap belt assembly 706. Seat pan assembly 700 also optionally comprises weight-on-seat tape switch 710, a sound transducer (preferably a tactile sound transducer) (not shown), an accelerometer (not shown), links 708 that tighten and loosen the lap belt in response to simulated vehicle motions, and tape (not shown) for attaching the bottom cushion.

Figure 8:
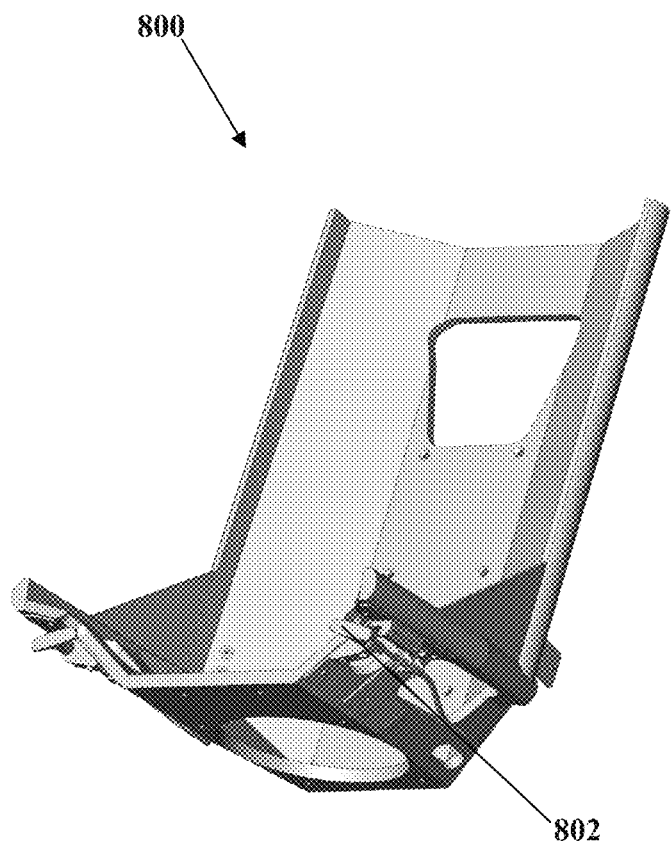
FIG. 8 illustrates an embodiment of the present invention comprising a bucket assembly for a DMS.

An embodiment of the present invention, as illustrated in FIG. 8, preferably comprises bucket assembly 800 comprising a reel adjustment (not shown) and seat adjustment 802. Back pan assembly 600 and seat pan assembly 700 are preferably disposed onto and fit in bucket assembly 800.

Figure 9:
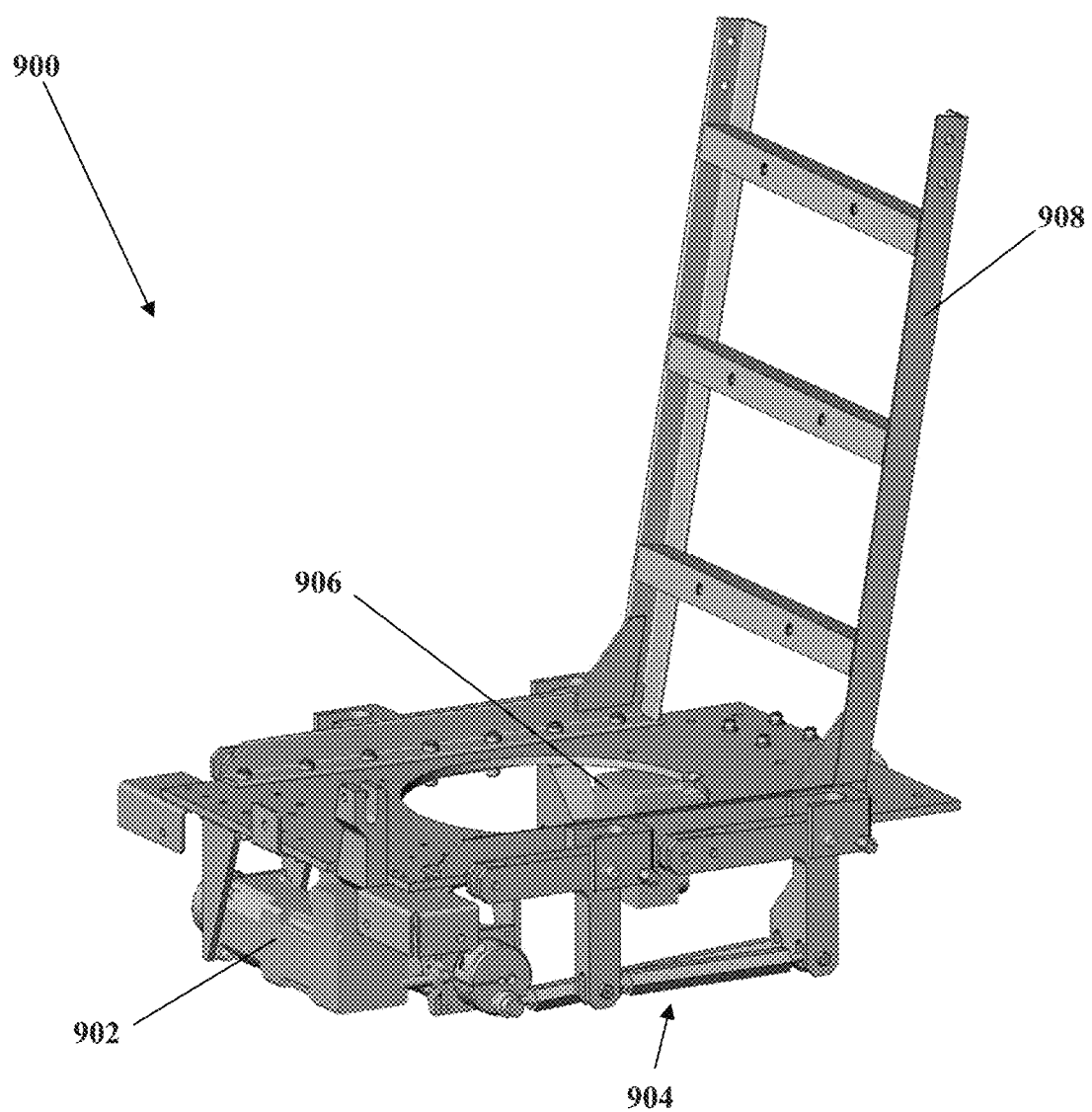
FIG. 9 illustrates an embodiment of the present invention comprising a motor drive assembly for a DMS.

FIG. 9 illustrates another embodiment of the present invention comprising motor drive assembly 900 which is preferably located beneath the DMS. Motor drive assembly 900 preferably comprises two motor assemblies 902, preferably a squab heave motor assembly, and associated linkages 904 as well as third motor assembly 906, preferably a surge motor assembly, as illustrated in FIG. 9. It also optionally comprises bucket support frame 908. Bucket assembly 800 fits onto motor drive assembly 900.

Figure 10:
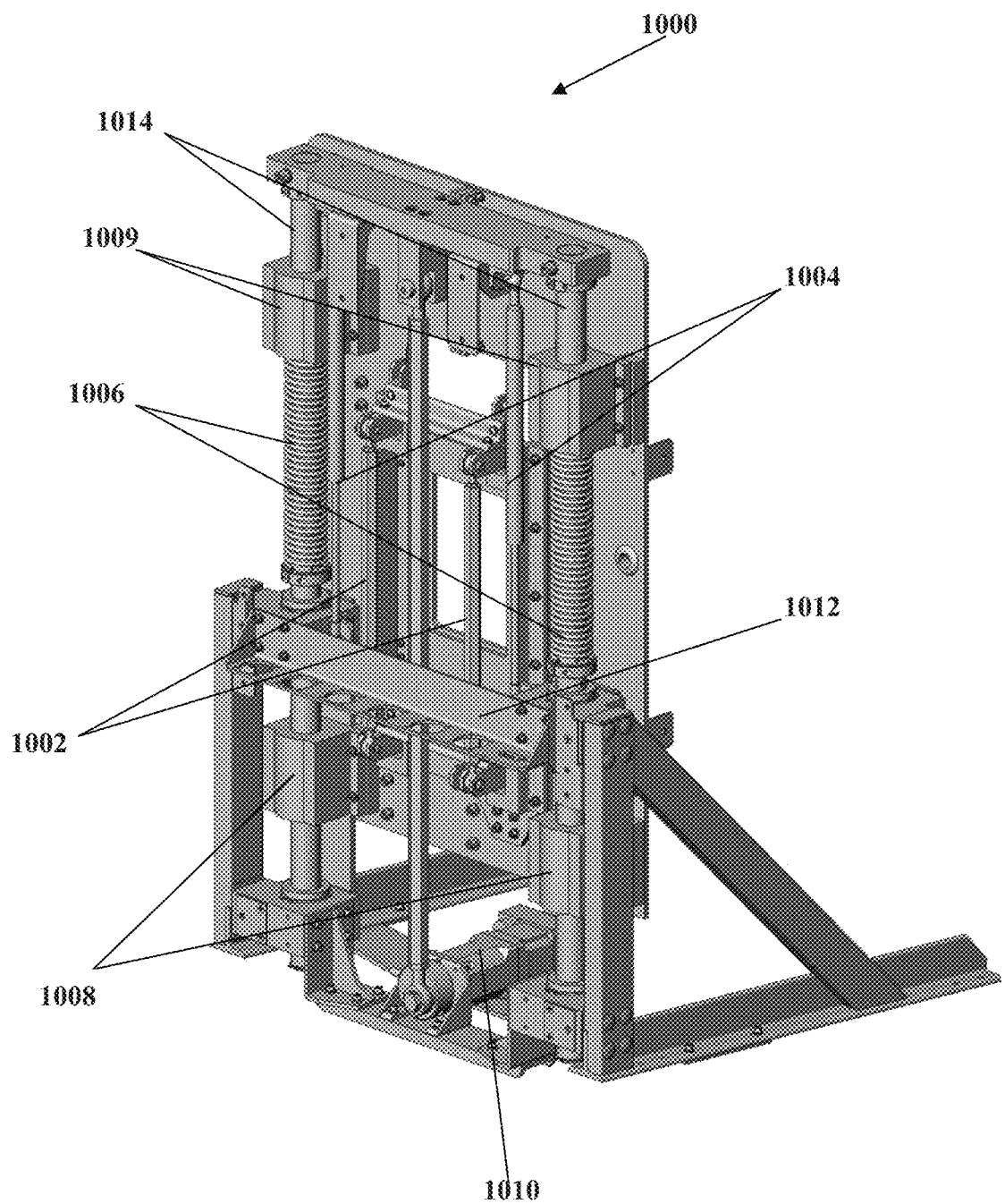
FIG. 10 illustrates an embodiment of the present invention comprising a rear plate assembly for a DMS.

One embodiment of the present invention comprises rear plate assembly 1000, illustrated in FIG. 10. Rear plate assembly 1000 preferably acts as a main structure of the DMS and comprises mechanical linkages 1002 for back pan movements, as well as shafts 1014, counter-balance springs 1006, and linear bearings 1008 and 1009 for the DMS's manual height adjustment mechanism. Rear plate assembly 1000 optionally comprises motor assembly 1010, preferably bucket heave and sway (not shown). Attached to rear plate assembly 1000 is electrical connector interface panel 1012 with one or more connectors and preferably seven-five for motor drive/signal, one for accelerometers and one for interlocks, position sensors, and the sonic transducer. Rear plate assembly 1000 also optionally comprises gas springs 1004 to relieve the DMS's weight on the bucket heave motor assembly.

Figure 11:
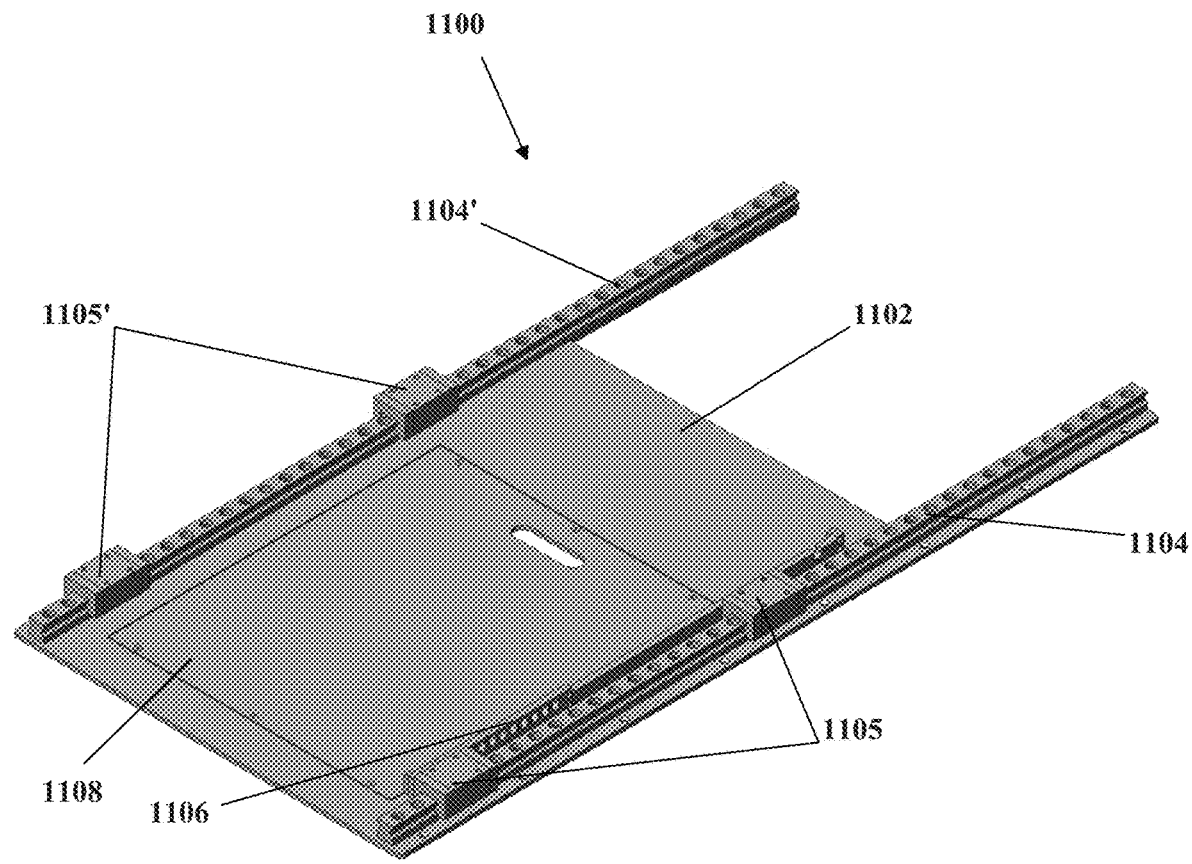
FIG. 11 illustrates an embodiment of the present invention comprising a base assembly for a DMS.

Referring to FIG. 11, an embodiment of the present invention comprises base assembly 1100 which is the primary mechanical interface between the DMS and a host training device/simulator. Base assembly 1100 preferably comprises base plate 1102, adjustment rails 1104 and 1104' with bearings 1105 and 1105', longitudinal adjustment/egress rail 1106, and trainer access cover 1108.

The DMS optionally comprises a plurality of removable safety covers, preferably eight, primarily located over the motors and mechanical linkages. The safety covers prevent inadvertent user/operator contact with moving components or components with voltage.

In one embodiment of the present invention, and independent of the dynamic motion of the DMS, a user can adjust the DMS's position in a manner similar to a seat in a vehicle. In a preferred embodiment, two coil springs in back of the DMS counter balance the DMS's weight during the height adjustment. There is also a longitudinal adjustment handle. In addition, the DMS has a lever to lock and release the inertia reel attached to the shoulder harness. The seat adjustments are preferably made by actuating a lever. The lever is preferably located at the front of the seat, under the seat pad. There are preferably two levers, one on each side of the seat. One lever allows the user to adjust the seat vertically; the other lever allows the user to adjust the seat longitudinally. The levers also preferably control a locking system for the seat position. For example, when the lever is pulled, the lock is released. A user can then physically move the seat to the desired position.

In another embodiment of the present invention, shoulder harness tension of the DMS is provided by a motor under control of the computer. Software on the computer preferably determines the tension to be placed in the harness by the motor based on the vehicle accelerations. The active shoulder harness tension preferably works with the inertial reel lock mechanism to provide a representation of a typical harness operation in a vehicle.

In a further embodiment of the present invention, the DMS computer software communicates to a host computer through an Ethernet network interface or a custom interface developed to meet a users requests. The DMS computer software preferably runs on a Pentium based PC using the Linux Operating System that provides drivers for an Ethernet board. In this embodiment, the DMS computer comprises an Ethernet Connectionless Protocol (UDP), or Ethernet Connection Protocol (TCP/IP), or Reflective Memory Type interface, or a custom interface developed to meet a users needs for communication with a host computer preferably over an Ethernet connection. UDP is preferred for ease of integration and its connectionless ability. A host computer sends data at a rate of preferably no less than one command per second. If the data is sent at a rate of less than one command per second, the DMS preferably powers off. This logic ensures that the DMS is not powered unless communication is established with a host computer. The DMS computer software is configured to listen on a user configured port at the network address defined by the user.

A DMS computers Ethernet adapter card preferably supports 10 Mbps, 100 Mbps and 1000 Mbps packet transmission rates. The card preferably uses a connector that will support Category 3, 4, or 5 twisted-pair wiring and more preferably uses an RJ-45 connector. For operation at 100 Mbps, the network cable is preferably a Category 5 twisted-pair cable.

In the present embodiment, the computer assembly software functions preferably comprise:
1. Input from a Host Computer—A host computer preferably provides acceleration data, special effect flags, and mode command information to the DMS computer through an Ethernet interface.
2. Translation and creation of corresponding DMS motion commands—An incoming host computer signal is received by the DMS computer and is translated into analog position commands that are then sent to the individual motor controllers.
3. System Testing and Error Detection—The motor controllers continuously receive input from the DMS computer and corresponding position feedback from individual motors. The status of the system is displayed on a monitor. System errors are determined by evaluating the motor status. Direct system testing is accomplished through a Daily Operational Readiness Test (DORT), discussed below.
4. Determining DMS Displacements—The DMS displacements are established by the DMS computer. An incoming host computer signal is preferably recognized by the DMS computer. The signal is translated into analog position commands that are then sent to the motor controllers. The motor controllers send the movement signal to the motors. Motor position feedback, preferably a quadrature signal, is returned to the motor controller which returns the position information to the DMS computer. DMS displacement is preferably a continuous process of movement command and checking position. A motor control loop comprises a signal from the DMS computer to the controller to the motor and back through the controller to the DMS computer.

In one embodiment of the present invention, the electronics functions preferably comprise a motor drive, a power protection circuit, and a homing sensor. The motor drive preferably uses DMS movement commands to drive its corresponding motor. In this embodiment, a power protection circuit provides circuit protection for the DMS system. Preferably, each motor drive, system channel and PLC is individually fused for circuit protection. A homing sensor establishes a starting travel position for the DMS when the DMS computer is powered on. Each DMS motor preferably has a home position. The home position is a fixed reference point that does not precisely correspond to the center of the motor travel.

In another embodiment of the present invention, the DMS system comprises a safety circuit, also known as interlocks, to prevent un-commanded or undesired movement of the DMS. Each of the interlocks is preferably continuously satisfied, and if they are not satisfied the DMS system will cease moving.

In an embodiment of the operation of the present invention, the DMS operation is divided into startup, shutdown and normal operating procedures. The DMS computer is powered from one or more of the electronics chassis. An optional DMS monitor application is used as a user interface in the DMS computer and enables a user to view status information, run tests, tune parameter and integrate a seat efficiently. The DMS monitor application can monitor interlock status, motor parameters, controller parameters, and host interfaces. In addition, the DMS monitor application provides Daily Operational Readiness Tests (DORT) and factory acceptance tests. The application can also modify the signal gains that effect the seat motion equations in order to fine-tune the DMS responses. The DMS monitor application is preferably started through a monitor, preferably a PC monitor, directly connected to the DMS computer. A shortcut on a PC monitor desktop can launch the DMS monitor application.

In a further embodiment of the present invention, a virtual network computer (VNC), acting as a DMS computer, can access the DMS monitor application remotely. In these embodiments, the DMS monitor application program is preferably started either through a personal computer monitor directly connected to the DMS computer or remotely through the VNC viewer. The DMS system can be operated through the DMS monitor application via VNC from any computer on a network. This provides monitoring and control capability for DMS systems without a PC monitor directly connected to the DMS system.

In one embodiment of the present invention, a DMS monitor application comprises adjustable motion gains for a DMS. These motion gains are adjustable to customer specifications. The motion gains can comprise malfunctions such a main rotor out of track, main rotor out of balance, and main rotor de-bonding. An instructor can then input one of the malfunctions to see how a user responds to the simulated malfunction. The DMS system can also provide special response to touchdown, weapon impact and weapons fly-out.

Figure 12:
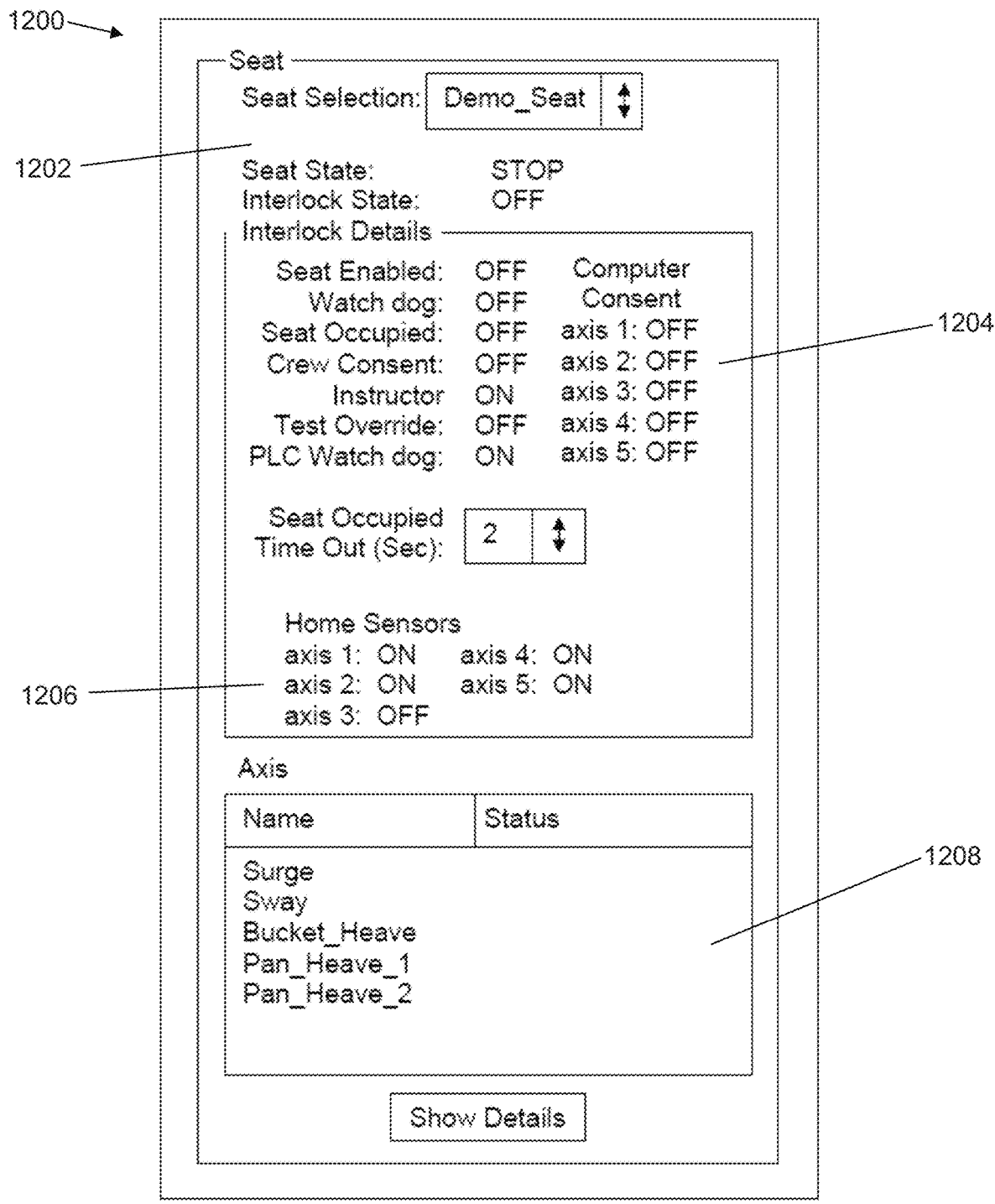
FIG. 12 illustrates an embodiment of the present invention comprising status information in four main subsections.

FIG. 12 illustrates an example of a host data interface window 1200 which comprises system information on a host interface. One or more interfaces can exist in host data interface window 1200. Host data interface window 1200 further comprises DMS window 1202 that displays DMS status information. Interlock details subsection 1204 comprises information on the status of different interlock elements, a computer consent channel, and a DMS occupied timeout option. Axis window 1206 displays the state of all motor controllers. Dialog window 1208 displays drive information and errors as well as provides several axis specific functions.

One embodiment of the present invention preferably comprises a test tab that enables a user to run tests with the DMS computer without a host computer input. The tab preferably provides the ability to run tests, including but not limited to, a daily operational readiness test (DORT), a manual test and an autotest.

A DORT preferably comprises an internal system analysis of the DMS system components. The DORT confirms functionality and interaction between system components such as the DMS computer, electronics chassis, and one or more DMSs. The DORT also confirms proper operation of all motors by driving each motor through its full range of travel and then stopping at the motor neutral point between the farthest travel points.

An autotest is optionally a built-in DMS performance test. It is preferably used to measure the dynamic performance of each channel of motion. The test can also compare the commanded motion with data from accelerometer sensors mounted on the seat. The test can further measure dynamic performance using the position sensors if the seat is not equipped with accelerometers.

An embodiment of the present invention preferably further comprises a tune tab enabling fine-tuning of a DMS performance and an integration tab that displays data sent from a host computer to a DMS. The data sent from the host computer can be utilized to ensure a DMS is performing properly with the commanded input and to help troubleshoot if a DMS fails to respond accurately to the simulation inputs. A user can monitor the values on the integration tab during a simulation to ensure host data is being properly transmitted. This embodiment can also comprise a data plotting tab that allows a user to plot all relevant data from a DMS.

Figure 14:
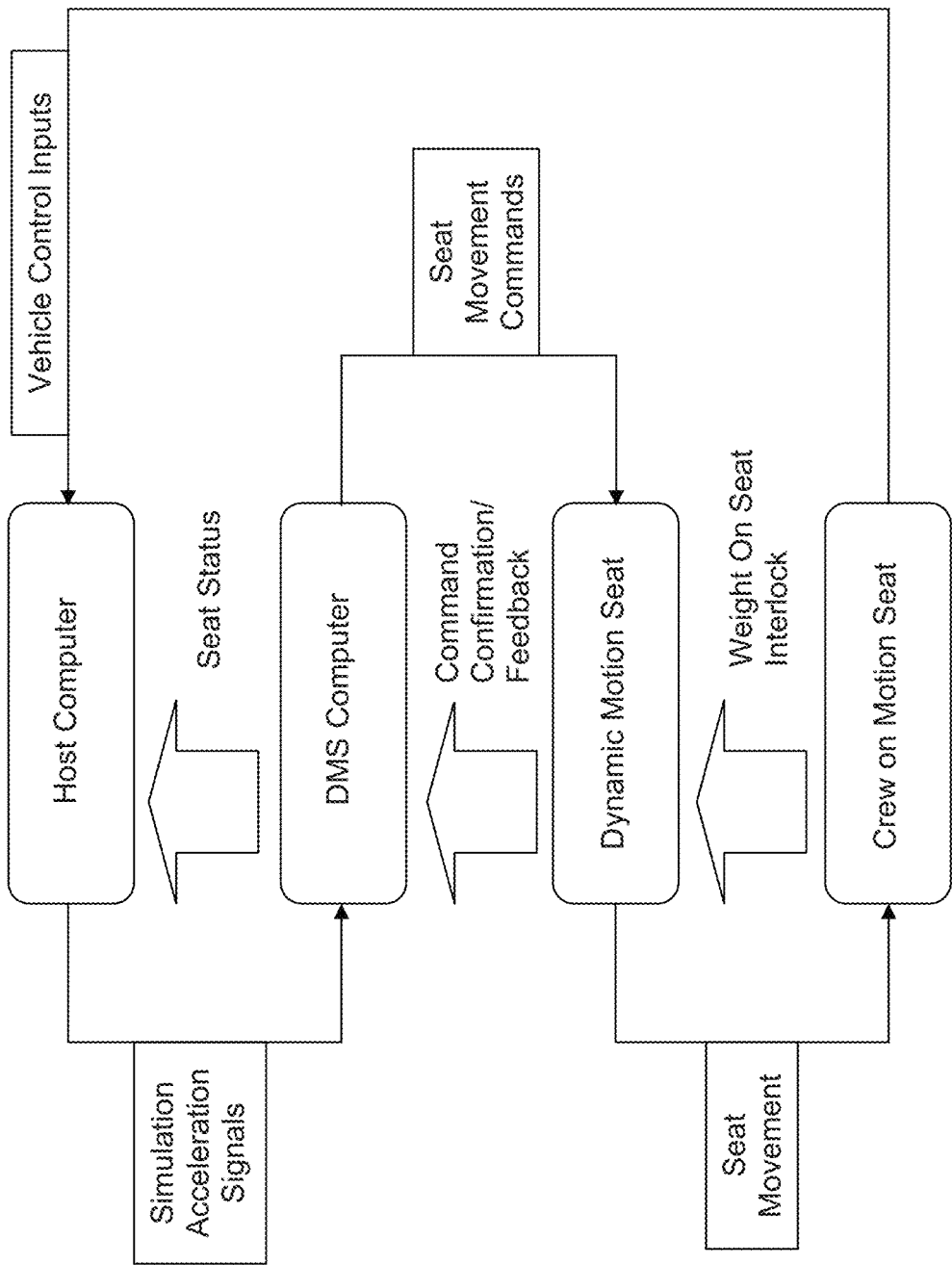
FIG. 14 is a flowchart of the operation of an embodiment of the present invention.

FIG. 14 illustrates a flow chart of an embodiment of the present invention. In this embodiment, a subject themselves on a DMS seat, and a host computer sends signals to a DMS computer regarding how the DMS in simulation is moving, for example, the velocity, lateral direction, altitude, vector, etc. The DMS computer then translates the host computer signals to specific seat movements. The DMS then moves according to the signals so that the subject feels the seat move in response to the host computer signals. The subject responds to the motion of the seat by providing control stick and/or throttle and/or pedals and/or steering wheel commands. The subject response is then sent to the host computer who then sends signals to the DMS computer and the entire process is repeated.

One embodiment of the present invention comprises a method for simulating vehicle motion for training a subject. This embodiment preferably comprises seating the subject in a seat having at least 5 axes of motion, a motor, and at least one mechanical linkage. The DMS seat system then initializes vehicle motion simulation using the host computer that is in communication with the dynamic motion seat (DMS) computer. The host computer sends signals to the DMS computer, telling the DMS computer how the seat should move based on the simulation. The DMS computer then translates the signals to create corresponding seat motion signals. The electronic components then convert the seat motion signals received from the DMS computer into drive signals. These drive signals trigger the motor to move the seat. The motor then actuates a selected mechanical linkage that causes movement in at least one axes of the five axes of motion of the seat to simulate vehicle motion that is felt by the subject. The simulated vehicle motion preferably replicates the relative magnitude of force produced by an actual vehicle in motion. The simulated vehicle motion is preferably correlated to a visual view of a vehicle in motion presented to the subject in the seat. The subject then trains using the seat by responding to the vehicle motion and corresponding visual view. In an alternative embodiment of the present invention, the visual view is a visual view of a simulated vehicle in motion. In another embodiment, the visual view is a visual view from an actual vehicle in motion. The visual view is preferably equivalent to a view from the driver's side of a vehicle looking through the windshield to the surrounding landscape.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A dynamic motion seat that simulates vehicle motion comprising:
   a seat comprising a seat pan and a backpad disposed onto a bucket assembly, at least one motor, at least one mechanical linkage, wherein said seat pan and said backpad move independently and wherein said dynamic motion seat simulates at least four axes of vehicle motion selected from the group consisting of seat pan tilt, backpad sway, backpad surge, seat pan squab heave, backpad roll, and bucket heave, wherein said seat pan tilt results from independently displacing either side of said seat pan vertically, said backpad sway results from displacing said backpad laterally, said backpad surge results from displacing said backpad longitudinally, said seat pan squab heave results from displacing said seat pan vertically, said bucket heave results from displacing said bucket vertically, and said backpad roll results from independently displacing either side of said backpad laterally and longitudinally and wherein said at least four axes of vehicle motion are controlled via a dynamic motion seat computer in communication with said at least one motor.

2. The dynamic motion seat of claim of claim 1 comprising said seat pan tilt.

3. The dynamic motion seat of claim 1 comprising said backpad surge.

4. The dynamic motion seat of claim 1 comprising said backpad sway.

5. The dynamic motion seat of claim 1 comprising said seat pan squab heave.

6. The dynamic motion seat of claim 1 comprising said backpad roll.

7. The dynamic motion seat of claim 1 wherein said mechanical linkage comprises at least one bell crank.

8. The dynamic motion seat of claim 1 wherein said mechanical linkage comprises at least one rod.

9. The dynamic motion seat of claim 1 wherein said mechanical linkage comprises at least one bell crank and at least one rod.

10. The dynamic motion seat of claim 1 comprising said bucket heave.

11. A method for simulating vehicle motion for training a responsive human subject comprising:

a dynamic motion seat comprising a seat pan and a backpad disposed onto a bucket assembly, at least one motor, and at least one mechanical linkage wherein said backpad and said seat pan move independently and wherein said dynamic motion seat simulates at least four axes of vehicle motion selected from the group consisting of seat pan tilt, back pad sway, backpad surge, seat pan squab heave, backpad roll, and bucket heave, wherein said seat pan tilt results from independently displacing either side of said seat pan vertically, said backpad sway results from displacing said backpad laterally, said backpad surge results from displacing said backpad longitudinally, said seat pan squab heave results from displacing said seat pan vertically, said bucket heave results from displacing the bucket vertically, and said backpad roll results from independently displacing either side of said backpad laterally and longitudinally and wherein said at least four axes of vehicle motion are controlled via a dynamic motion seat computer in communication with said at least one motor;

triggering movement of said dynamic motion seat via said motor in connection with said at least one mechanical linkage; and actuating a selected mechanical linkage to cause movement in at least one axis of said four axes of motion of said dynamic motion seat to simulate vehicle motion that is felt by the responsive human subject, wherein said dynamic motion seat simulates said relative magnitude of force produced by an actual vehicle in motion.

12. The method of claim 11 further comprising moving one or more of said four axes of vehicle motion independently.

13. The method of claim 11 wherein the responsive human subject responds to said dynamic motion seat motion via a steering wheel.

14. The method of claim 11 wherein the responsive human subject responds to said dynamic motion seat motion via a control stick.

15. The method of claim 11 wherein the responsive human subject responds to said dynamic motion seat motion via one or more pedals.

16. The method of claim 11 wherein the responsive human subject responds to said dynamic motion seat motion via a throttle.

17. The dynamic motion seat of claim 1 wherein independent movement occurs between said axes of motion.

* * * * *